(12) United States Patent
Ma et al.

(10) Patent No.: US 11,100,886 B2
(45) Date of Patent: Aug. 24, 2021

(54) SMART WINDOW, CONTROL METHOD THEREOF, AND TRANSPORT VEHICLE

(71) Applicant: BOE TECHNOLOGY GROUP CO., LTD., Beijing (CN)

(72) Inventors: Xitong Ma, Beijing (CN); Tao Li, Beijing (CN); Naifu Wu, Beijing (CN); Qi Zeng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 95 days.

(21) Appl. No.: 16/479,136

(22) PCT Filed: Nov. 29, 2018

(86) PCT No.: PCT/CN2018/118123
§ 371 (c)(1),
(2) Date: Jul. 18, 2019

(87) PCT Pub. No.: WO2019/184414
PCT Pub. Date: Oct. 3, 2019

(65) Prior Publication Data
US 2020/0357355 A1 Nov. 12, 2020

(30) Foreign Application Priority Data
Mar. 26, 2018 (CN) .......................... 201810257151.3

(51) Int. Cl.
B60J 1/20 (2006.01)
B60K 35/00 (2006.01)
(Continued)

(52) U.S. Cl.
CPC ................. G09G 5/00 (2013.01); B60J 1/20 (2013.01); B60K 35/00 (2013.01); G06F 3/013 (2013.01);
(Continued)

(58) Field of Classification Search
CPC ............. G09G 5/00; G09G 2320/0238; G09G 2320/0261; G09G 2354/00;
(Continued)

(56) References Cited

U.S. PATENT DOCUMENTS

2008/0129723 A1* 6/2008 Comer .................. G06T 3/0018
345/419
2017/0220106 A1 8/2017 Tomiyama et al.
2018/0012562 A1* 1/2018 Mertens .............. G06F 3/04847

FOREIGN PATENT DOCUMENTS

CN 103273826 A 9/2013
CN 104589969 A 5/2015
(Continued)

OTHER PUBLICATIONS

First Office Action and English language translation, CN Application No. 201810257151.3, dated Mar. 22, 2019, 13 pp.
(Continued)

Primary Examiner — Temesghen Ghebretinsae
Assistant Examiner — Karin Kiyabu
(74) Attorney, Agent, or Firm — Myers Bigel, P.A.

(57) ABSTRACT

The present disclosure provides a smart window, a control method thereof, and a transport vehicle. The smart window may include a detector, a collector, a displayer and a processor. The detector is configured to detect whether a close-range scene exists. The collector is configured to collect position information of a human eye. The processor is connected to the detector and the collector, and configured to calculate coordinates of the close-range scene, calculate coordinates of the human eye according to the position information of the human eye, obtain a frame-extracted area according to the coordinates of the close-range scene and coordinates of the human eye, perform black insertion for pixels in the frame-extracted area in the displayer, and
(Continued)

generate a display signal. The displayer is connected to the processor and configured to display according to the display signal.

19 Claims, 3 Drawing Sheets

(51) Int. Cl.
*G09G 5/00* (2006.01)
*G06F 3/01* (2006.01)

(52) U.S. Cl.
CPC .. *B60K 2370/152* (2019.05); *B60K 2370/785* (2019.05); *G09G 2320/0238* (2013.01); *G09G 2320/0261* (2013.01); *G09G 2354/00* (2013.01); *G09G 2380/10* (2013.01)

(58) Field of Classification Search
CPC ........ G09G 2380/10; B60J 1/20; G06F 3/013; B60K 2370/152; B60K 2370/785
See application file for complete search history.

(56) References Cited

FOREIGN PATENT DOCUMENTS

| | | | |
|---|---|---|---|
| CN | 105751862 A | | 7/2016 |
| CN | 106601198 A | | 4/2017 |
| CN | 108428428 A | | 8/2018 |
| CN | 207790492 U | * | 8/2018 |

OTHER PUBLICATIONS

Second Office Action and English language translation, CN Application No. 201810257151.3, dated Dec. 10, 2019, 13 pp.

* cited by examiner

SMART WINDOW, CONTROL METHOD THEREOF, AND TRANSPORT VEHICLE

RELATED APPLICATIONS

The present application is the U.S. national phase entry of PCT/CN2018/118123, with an international filing date of Nov. 29, 2018, which claims the benefit to Chinese Patent Application No. 201810257151.3, filed on Mar. 26, 2018, the entire disclosures of which are incorporated herein by reference.

FIELD

Embodiments of the present disclosure relate to the field of smart technologies, and specifically to a smart window, a control method thereof, and a transport vehicle.

BACKGROUND

Ordinary glass panes are mounted on windows of current transport vehicles such as buses or trains. When people are traveling by a transport vehicle, they often appreciate the scenery outside the window. At this time, as long as an object displacing at a high speed in a close range is seen by the human eye, dizziness will be caused.

SUMMARY

According to an aspect of the present disclosure, there is provided a smart window. The smart window may comprise a detector, a collector, a displayer and a processor. The detector may be configured to detect whether a close-range scene exists. The collector may be configured to collect position information of a human eye. The processor may be connected to the detector and the collector, and configured to calculate coordinates of the close-range scene, calculate coordinates of the human eye according to the position information of the human eye, obtain a frame-extracted area according to the coordinates of the close-range scene and the coordinates of the human eye, perform black insertion for pixels in the frame-extracted area in the displayer, and generate a display signal. The displayer may be connected to the processor and configured to display according to the display signal.

In an embodiment, the detector may comprise a plurality of infrared sensors.

In an embodiment, the plurality of infrared sensors may be disposed in a direction vertical to the ground.

In an embodiment, the displayer may comprise a transparent display screen.

In an embodiment, the position information of the human eye may comprise a distance between the human eye and the collector, an angle between a line segment connecting the human eye with the collector and a first direction, and an angle between the line segment connecting the human eye with the collector and a second direction, wherein the first direction is a direction vertical to the ground, and the second direction is a moving direction of the smart window.

In an embodiment, the processor may be configured to judge whether a moving speed of the smart window is greater than or equal to a speed threshold, and send a detection instruction to the detector as well as send a collection instruction to the collector when it is judged that the moving speed of the smart window is greater than or equal to the speed threshold. The detector may be configured to detect whether the close-range scene exists according to the detection instruction. The collector may be configured to collect the position information of the human eye according to the collection instruction.

In an embodiment, the detector may be configured to detect whether there is a close-range scene within a threshold distance.

In an embodiment, the processor may be configured to calculate the coordinates of the close-range scene according to coordinates of an infrared sensor of the plurality of infrared sensors that has detected the close-range scene, a moving speed of the smart window, a moving duration of the smart window after the close-range scene is detected, and a distance between the infrared sensor and the close-range scene.

In an embodiment, the processor may be configured to calculate the coordinates of the human eye according to coordinates of the collector and the position information of the human eye.

In an embodiment, the processor may be configured to obtain coordinates of an intersection point between a line segment connecting the human eye with the close-range scene and the displayer according to the coordinates of the close-range scene and the coordinates of the human eye, and obtain a frame-extracted area according to the coordinates of the intersection point and a resolution of the displayer.

According to another aspect of the present disclosure, there is provided a transport vehicle. The transport vehicle may comprise a plurality of smart windows stated above.

According to a further aspect of the present disclosure, there is provided a method for controlling a smart window. The method is applied to the smart window mentioned above. The method may comprise: detecting whether a close-range scene exists, collecting position information of a human eye, calculating coordinates of the close-range scene, calculating coordinates of the human eye according to the position information of the human eye, obtaining a frame-extracted area according to the coordinates of the close-range scene and the coordinates of the human eye, performing black insertion for pixels in the frame-extracted area in the displayer, generating a display signal, and displaying according to the display signal.

In an embodiment, before detecting whether a close-range scene exists and collecting the position information of the human eye, the method further comprise: judging whether a moving speed of the smart window is greater than or equal to a speed threshold, and generating a detection instruction and a collection instruction when it is judged that the moving speed of the smart window is greater than or equal to the speed threshold, and wherein detecting whether a close-range scene exists comprises detecting whether the close-range scene exists according to the detection instruction, and collecting the position information of the human eye comprises collecting the position information of the human eye according to the collection instruction.

In an embodiment, detecting whether the close-range scene exists may comprise detecting whether there is a close-range scene within a threshold distance.

In one embodiment, the detector may comprise a plurality of infrared sensors. Calculation of coordinates of the close-range scene may comprise: calculating the coordinates of the close-range scene according to coordinates of an infrared sensor of the plurality of infrared sensors that has detected the close-range scene, a moving speed of the smart window, a moving duration of the smart window after the close-range scene is detected, and a distance between the infrared sensor and the close-range scene.

In an embodiment, the position information of the human eye may comprise a distance between the human eye and the collector, an angle between a line segment connecting the human eye with the collector and a first direction, and an angle between the line segment connecting the human eye with the collector and a second direction. The first direction is a direction vertical to the ground, and the second direction is a moving direction of the smart window.

In an embodiment, calculation of coordinates of the human eye according to the position information of the human eye may comprise calculating the coordinates of the human eye according to coordinates of the collector and the position information of the human eye.

In an embodiment, the coordinates of the human eye are obtained using the following equations:

$a = a_0 - l \sin\theta_1 \cos\theta_2$ $b = b_0 - l \cos\theta_1$ $c = c_0 - l \sin\theta_1 \sin\theta_2$, where a represents an x coordinate of the human eye, b represents a y coordinate of the human eye, c represents a z coordinate of the human eye, $a_0$ represents an x coordinate of the collector, $b_0$ represents a y coordinate of the collector, and $c_0$ represents a z coordinate of the collector, l represents a distance between the human eye and the collector, $\theta_1$ represents an angle between a line segment connecting the human eye with the collector and a first direction, and $\theta_2$ represents an angle between the line segment connecting the human eye with the collector and a second direction.

In an embodiment, obtaining of the frame-extracted area according to the coordinates of the close-range scene and the coordinates of the human eye may comprise: obtaining coordinates of an intersection point between a line segment connecting the human eye with the close-range scene and the displayer according to the coordinates of the close-range scene and the coordinates of the human eye, and obtaining the frame-extracted area according to the coordinates of the intersection point and a resolution of the displayer.

In an embodiment, performance of black insertion may comprise inserting a full black frame into pixels within the frame-extracted area within adjacent two or more frames.

BRIEF DESCRIPTION OF THE DRAWINGS

The figures are used to provide a further understanding of the technical solutions of the present disclosure, and constitute a part of the specification. The figures are used together with embodiments of the present disclosure to illustrate the technical solutions of the present disclosure, and are not construed as limiting the technical solutions of the present disclosure.

DETAILED DESCRIPTION

Figure 1:
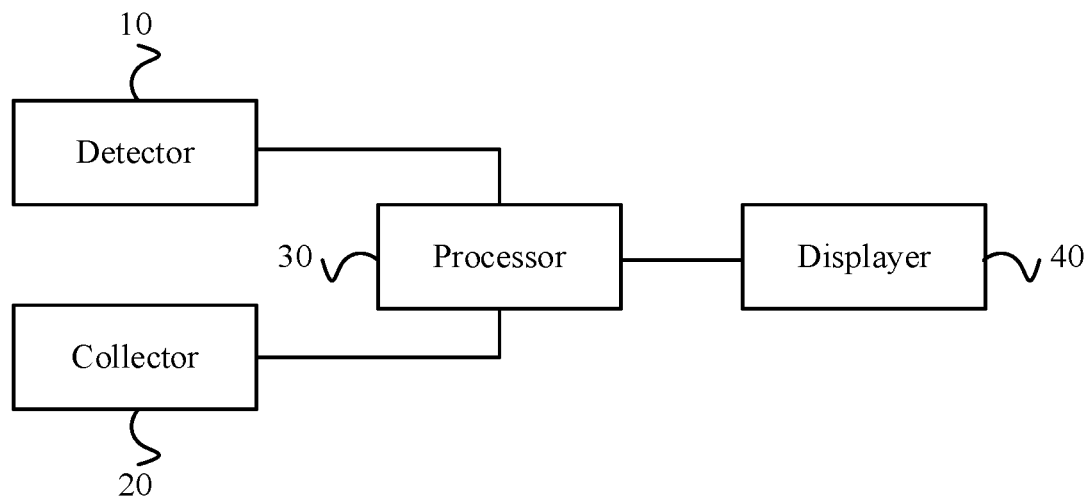
FIG. 1 is a structural block diagram of a smart window according to an embodiment of the present disclosure.

The embodiments of the present disclosure will be described in detail below with reference to the figures to make objects, technical solutions and advantages of the present disclosure more apparent. It should to be noted that in the case of no conflict, embodiments and features in the embodiments of the present disclosure may be arbitrarily combined with one another.

Steps illustrated in the flowcharts of the figures may be executed in a computer system such as a set of computer executable instructions. Furthermore, although logical orders are shown in the flowcharts, in some cases the steps shown or described may be performed in a different order than the ones described herein.

Unless otherwise defined, technical terms or scientific terms used in the disclosure of the embodiments of the present disclosure should be understood in the ordinary meaning of those of ordinary skill in the art. A word such as "comprising" or "comprising" used in the embodiments of the present disclosure indicates that an element or article before the word covers an element or article or its equivalents listed after the word, and does not exclude other elements or articles. The words such as "connect" or "couple" are not limited to physical or mechanical connection, but may comprise electrical connection, regardless of whether the electrical connection is direct or indirect.

Embodiments of the present disclosure provide a smart window, a control method thereof, and a transport vehicle. The smart window may comprise a detector, a collector, a displayer, and a processor. The detector may be configured to detect whether a close-range scene exists. The collector may be configured to collect position information of a human eye. The processor may be connected to the detector and the collector, and configured to calculate coordinates of the close-range scene, calculate coordinates of the human eye according to the position information of the human eye, obtain a frame-extracted area according to the coordinates of the close-range scene and coordinates of the human eye, perform black insertion for pixels in the frame-extracted area in the displayer and generate a display signal. The displayer may be connected to the processor and configured to display according to the display signal. The technical solution provided by the embodiment of the present disclosure makes movement of an object in a close-range scene become slower by detecting the close-range scene, obtaining a frame-extracted area according to the coordinates of the close-range scene and coordinates of the human eye, and performing black insertion for pixels in the frame-extracted area in the displayer. This may ensure that an occupant may see a far-range scene without being disturbed by a close-range scene, and effectively solve the dizziness problem.

Certainly, implementation of any of the products or methods of the present disclosure does not necessarily require all of the advantages described above to be achieved at the same time. Other features and advantages of the present disclosure will be set forth in subsequent embodiments of the present disclosure, and partly become apparent from the embodiments of the description, or are understood by implementing the present disclosure. The objectives and other advantages of the embodiments of the present disclosure may be achieved and obtained by the structures particularly pointed out in the description, claims and figures.

FIG. 1 is a structural block diagram of a smart window according to an embodiment of the present disclosure. As shown in FIG. 1, the smart window provided by the embodiment of the present disclosure may comprise a detector 10, a collector 20, a processor 30 and a displayer 40.

The detector 10 may be configured to detect whether a close-range scene exists. The collector 20 may be configured to collect position information of a human eye. The processor 30 may be connected to the detector 10 and the collector 20, and configured to calculate coordinates of the close-range scene, calculate coordinates of the human eye according to the position information of the human eye, obtain a frame-extracted area according to the coordinates of the close-range scene and coordinates of the human eye, perform black insertion for pixels in the frame-extracted area in the displayer 40 and generate a display signal. The displayer 40 may be connected to the processor 30 and configured to display according to the display signal.

In an embodiment, the detector 10 may comprise a plurality of infrared sensors. The plurality of infrared sensors is arranged in a direction vertical to the ground. The number of the infrared sensors may be determined according to actual needs, and is not limited by the embodiment of the present disclosure in any way. Different infrared sensors enable to detect close-range scenes at different heights. In this embodiment, the close-range scenes at different heights may be detected by the plurality of infrared sensors disposed in the direction vertical to the ground, which improves the applicability of the smart window provided by the embodiments of the present disclosure.

In the present embodiment, the detector 10 may be disposed outside the window, or may be disposed at other positions, as long as it may detect whether the close-range scene exists. It should be appreciated that the detector 10 may be configured to detect whether there is a close-range scene within a threshold distance. The numerical value of the threshold distance may be determined according to actual needs, and is not limited in the embodiment of the present disclosure in any way. The infrared sensors use a heat radiation effect to cause a temperature of an object in a close-range scene to change after it receives radiated energy, so that the infrared sensors detect whether there exists the close-range scene through a temperature change.

In an embodiment, the collector 20 may comprise a camera. The camera may be disposed above the human eye, or below the human eye. The specific position of the camera may be determined according to actual needs, and is not limited by the embodiment of the present disclosure in any way.

In an embodiment, the processor 30 may be implemented by a processing device that performs logical operations. The processing device may be any device having a data processing capability and/or program executing capability, such as a central processing unit (CPU), a field programmable logic array (FPGA), a digital signal processor (DSP), a microcontroller (MCU), or an application specific logic circuit (ASIC). It will be readily appreciated that the processor 30 may comprise a memory communicatively connected to the processor. Any combination of one or more computer program products is stored in the memory. The memory may comprise various forms of computer readable storage media such as volatile memory and/or nonvolatile memory. The volatile memory for example may comprise random access memory (RAM) and/or caches. The non-volatile memory for example may comprise a read only memory (ROM), a hard disk, an erasable programmable read only memory (EPROM), a USB memory and a flash memory. One or more computer instructions may be stored on the memory, and the processor may run the computer instructions to implement the analysis function of an analysis module. Various applications and various data, such as various data used and/or generated by the application, may also be stored in the computer readable storage medium.

In an embodiment, the displayer 40 may comprise a transparent display screen. In addition, the displayer 40 may further comprise: glass. It should be noted that the transparent display screen may be disposed on a side of the glass that is close to the human eye, or a side of the glass that is away from the human eye, which is not limited in this embodiment of the present disclosure in any way.

In the present embodiment, the processor 30 performing black insertion for pixels in the frame-extracted area in the displayer 40 refers to the processor 30 inserting a full black frame into the pixels within the frame-extracted area in two or more adjacent frames, to achieve an effect of increasing the total number of frames and make the original smeared picture become clear. In addition to inserting a whole frame of black picture, black insertion may also be performed by virtue of constant flash. This is not limited in this embodiment of the present disclosure in any way.

In the present embodiment, the connections between the processor 30 and the detector 10 as well as the collector 20 and the connection between the displayer 40 and the processor 30 all indicate communicative connections. A communicative connection may comprise a connection through a wireless network, a wired network, and/or any combination of a wireless network and a wired network. The network may comprise a local area network, the Internet, a telecommunications network, an internet of things based on the Internet and/or telecommunications network, and/or any combination of the above networks, and the like. The wired network may perform information transmission for example with a conductive wire, a twisted pair, a coaxial cable, an optical fiber transmission or the like. The wireless network for example may employ a communication manner such as a WWAN mobile communication network, Bluetooth, Zigbee or WiFi.

The smart window provided by embodiments of the present disclosure may comprise a detector configured to detect whether a close-range scene exists, a collector configured to collect position information of a human eye, a processor connected to the detector and the collector and configured to calculate coordinates of the close-range scene, calculate coordinates of the human eye according to the position information of the human eye, obtain a frame-extracted area according to the coordinates of the close-range scene and coordinates of the human eye, perform black insertion for the pixels in the frame-extracted area in the displayer, and generate a display signal, the displayer connected to the processor and configured to display according to the display signal. The technical solutions provided by the embodiments of the present disclosure make movement of an object in the close-range scene become slower by detecting the close-range scene, obtaining the frame-extracted area according to the coordinates of the close-range scene and coordinates of the human eye, and performing black insertion for the pixels in the frame-extracted area in the displayer. By means of distinguishing the close-range scene from the far-range scene and dynamically performing frame-extraction in respective areas, this may ensure that an occupant may see a far-range scene without being disturbed by the close-range scene, and effectively solve the dizziness problem.

Figure 2:
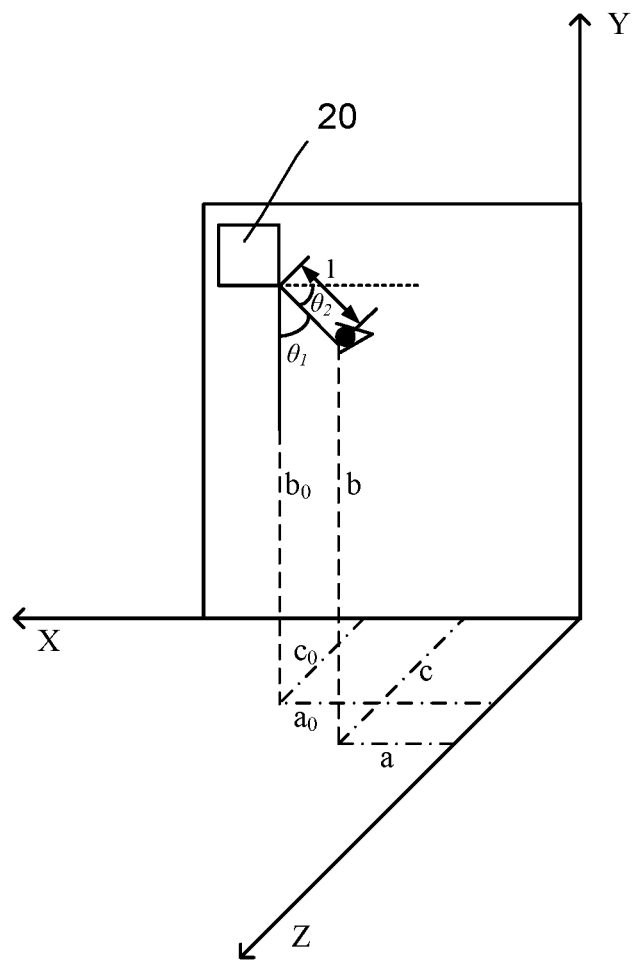
FIG. 2 is a schematic diagram illustrating a position of a smart window according to an embodiment of the present disclosure.

FIG. 2 is a schematic diagram illustrating a position of a smart window according to an embodiment of the present disclosure. The three-dimensional coordinate system as shown in FIG. 2 may comprise an X axis, a Y axis and a Z axis. In the present embodiment, the coordinates of the detector satisfy $x=z=0$, and the coordinates of the window plane satisfy $z=0$.

In the present embodiment, the position information of the human eye may comprise: a distance l between the human eye and the collector 20, an angle $\theta_1$ between a line segment connecting the human eye with the collector and a first direction, and an angle $\theta_2$ between the line segment connecting the human eye with the collector and a second direction. The first direction is a direction vertical to the ground (e.g., the y-axis as shown in FIG. 2), and the second direction is a moving direction of the smart window (e.g., the x-axis as shown in FIG. 2).

In an embodiment, the processor may be configured to obtain the coordinates of the human eye E (a, b, c) by using the following equations according to coordinates P ($a_0$, $b_0$, $c_0$) of the collector 20 and the position information l, $\theta_1$ and $\theta_2$ of the human eye (which may be collected according to the collector 20):

$a = a_0 - l \sin\theta_1 \cos\theta_2$ $b = b_0 - l \cos\theta_1$ $c = c_0 - l \sin\theta_1 \sin\theta_2$, The coordinates P of the collector 20 have been determined prior to the movement of the smart window and are known parameters.

In an embodiment, the processor may be configured to judge whether a moving speed of the smart window is greater than or equal to a speed threshold, and send a detection instruction to the detector as well as send a collection instruction to the collector when it is judged that the moving speed of the smart window is greater than or equal to the speed threshold. The detector may be configured to detect whether the close-range scene exists according to the detection instruction. The collector may be configured to collect the position information of the human eye according to the collection instruction.

When the smart window stops moving, its moving speed is zero. The value of the speed threshold may be determined according to actual needs, and is not limited by embodiments of the present application in any way.

Figure 3:
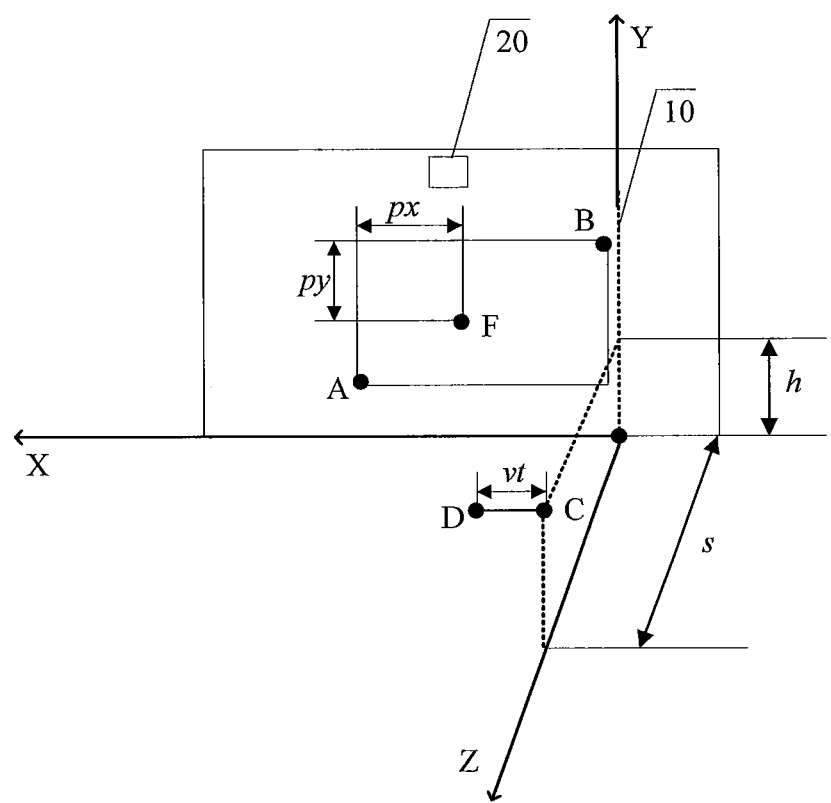
FIG. 3 is a schematic diagram illustrating a position of a smart window according to another embodiment of the present disclosure.

FIG. 3 is a schematic diagram illustrating a position of a smart window according to another embodiment of the present disclosure. As shown in FIG. 3, the processor may be configured to: calculate coordinates of the close-range scene according to coordinates (0, h, 0) of an infrared sensor of the plurality of infrared sensors that detected the close-range scene, a moving speed v of the smart window, a moving duration t of the smart window after the close-range scene is detected, and a distance s1 (for example, a threshold distance s) between the infrared sensor and the close-range scene. The coordinates (0, h, 0), the moving speed v, the duration t, and the distance s1 between the infrared sensor and the close-range scene are all known parameters. The close-range scene may be positioned within the threshold distance s, and its actual distance on the z-axis (i.e., the actual distance between the infrared sensor which detects the close-range scene and the close-range scene) may be detected by the infrared sensor and is therefore a known parameter. In one embodiment, the distance of the detected close-range scene on the z-axis may be exactly equal to the threshold distance s.

As time passes, the close-range scene moves from point C to point D, wherein coordinates of point C are (0, h, s1). At point D, the coordinates of the close-range scene are (vt, h, s1).

The processor may be configured to obtain coordinates F (u, w, 0) of an intersection point F between a line segment connecting the human eye with the close-range scene and the displayer by using the following equations according to the coordinates D (vt, h, s1) of the close-range scene and the coordinates E (a, b, c) of the human eye:

$$u = \frac{vts1 - as1}{c - s1} + vt$$

$$w = \frac{hs1 - bs1}{c - s1} + h.$$

The coordinates (x, y, z) of the intersection point F are obtained according to the following expression of the line segment connecting the human eye with the close-range scene:

$$\frac{x - vt}{a - vt} = \frac{y - h}{b - h} = \frac{z - s1}{c - s1}$$

wherein, since the displayer is located in the plane of the window, the coordinates of the intersection F satisfy z=0.

The frame-extracted area (px, py) is obtained by calculating with the following equations according to the coordinates (u, w, 0) of the intersection point F and a resolution P×Q of the displayer.

$$px = P - \frac{uP}{m_1}$$

$$py = \frac{(n_2 - w)Q}{n_2 - n_1}$$

where coordinates of a first diagonal of the window are A($m_1$, $n_1$, 0), and coordinates of a second diagonal are B(0, $n_2$, 0). It should be appreciated that the first diagonal is opposite to the second diagonal.

In an embodiment, P may be 1920 and Q may be 1080. The resolution of the displayer is determined according to a configuration of the displayer, and is not limited by embodiments of the present disclosure in any way.

The specific working principle of the smart window is described below in detail. The processor judges whether a moving speed of a smart window is greater than or equal to a speed threshold, and sends a detection instruction to a detector as well as sends a collection instruction to a collector when the moving speed of the smart window is greater than or equal to the speed threshold. The detector detects whether there is a close-range scene within a threshold distance according to the detection instruction. The collector collects position information of the human eye according to the collection instruction. The processor calculates coordinates of the close-range scene according to coordinates of an infrared sensor of the plurality of infrared sensors that detected the close-range scene, the moving speed of the smart window, a moving duration of the smart window after the close-range scene is detected, and a distance between the infrared sensor and the close-range scene when it is detected that there is the close-range scene within the threshold distance, calculates coordinates of the human eye according to the coordinates of the collector and the position information of the human eye, obtains coordinates of an intersection point between a line segment connecting the human eye with the close-range scene and the displayer according to the coordinates of the close-range scene and the coordinates of the human eye, obtains a frame-extracted area according to the coordinates of the intersection point and a resolution of the displayer, performs black insertion for pixels in the frame-extracted area in the displayer, and generates a display signal. The displayer displays according to the display signal.

Figure 4:
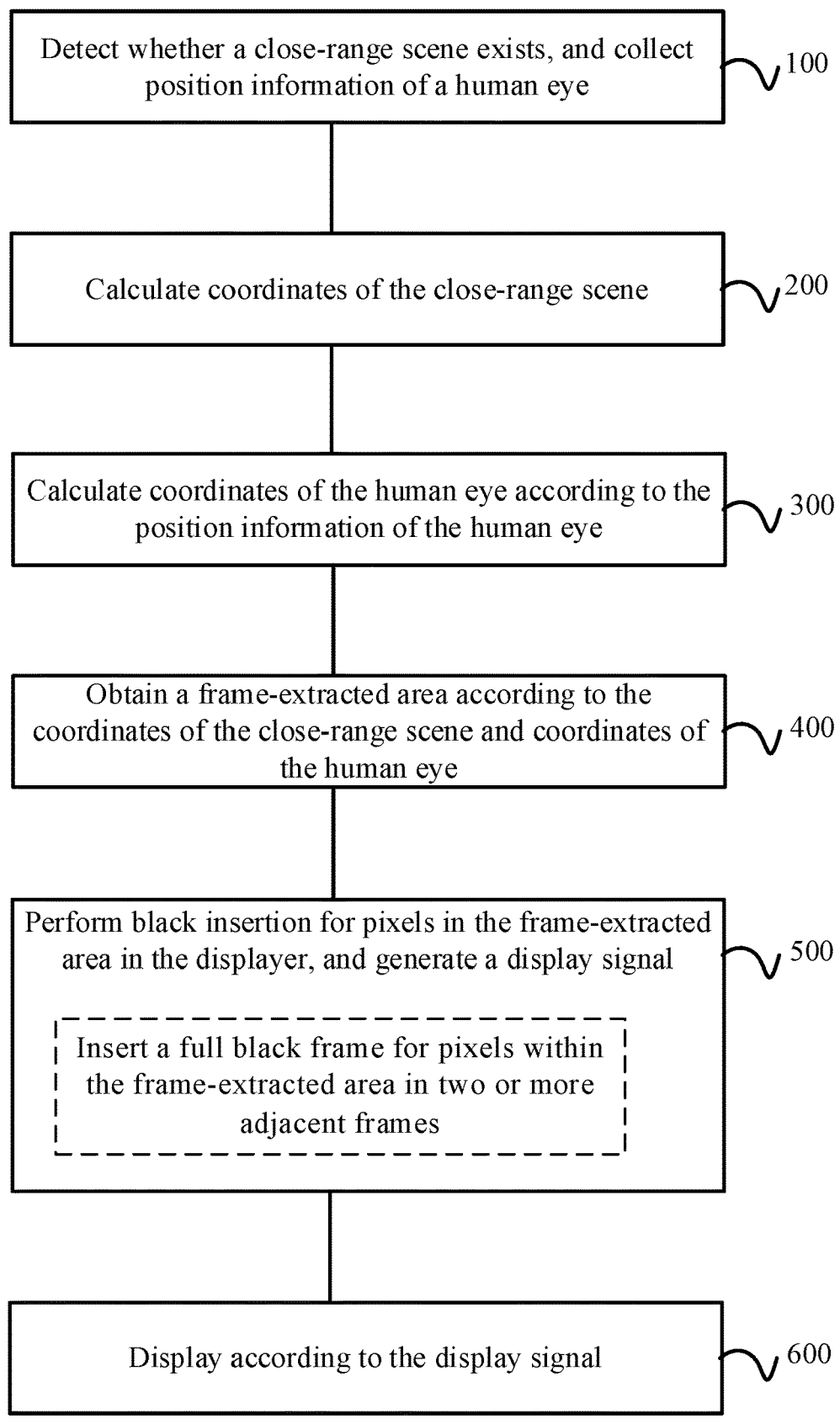
FIG. 4 is a flowchart of a method for controlling a smart window according to an embodiment of the present disclosure.

Based on the inventive concept of the present disclosure, an embodiment of the present disclosure further provides a method for controlling a smart window, which is applied in the smart window provided by an embodiment of the present disclosure. FIG. 4 is a flowchart of a method for controlling a smart window according to an embodiment of the present disclosure. As shown in FIG. 4, the method for controlling the smart window provided by an embodiment of the present disclosure may comprise the following steps.

At step 100, whether a close-range scene exists is detected, and position information of the human eye is collected.

In an embodiment, whether the close-range scene exists is detected by using a plurality of infrared sensors arranged in a direction vertical to the ground, and the position information of the human eye is obtained by a camera.

At step 200, coordinates of the close-range scene are calculated.

In an embodiment, the step 200 may comprise: calculating the coordinates of the close-range scene according to coordinates of an infrared sensor of the plurality of infrared sensors that detected the close-range scene, a moving speed of the smart window after the close-range scene is detected, a moving duration of the smart window, and a distance s1 between the infrared sensor and the close-range scene.

At step 300, the coordinates of the human eye are calculated based on the position information of the human eye.

The position information of the human eye may comprise a distance between the human eye and the collector, an angle between a line segment connecting the human eye with the collector and a first direction, and an angle between the line segment connecting the human eye with the collector and a second direction. It should be appreciated that the first direction refers to a direction vertical to the ground, and the second direction refers to a direction the same as a moving direction of the smart window.

Step 300 may comprise calculating coordinates of the human eye based on coordinates of the collector and the position information of the human eye.

At step 400, a frame-extracted area is obtained according to the coordinates of the close-range scene and the coordinates of the human eye.

Step 400 may comprise obtaining coordinates of an intersection point between a line segment connecting the human eye with the close-range scene and the displayer according to the coordinates of the close-range scene and the coordinates of the human eye, obtaining the frame-extracted area according to the coordinates of the intersection point and a resolution of the displayer.

At step 500, black insertion is performed for pixels in the frame-extracted area in the displayer, and a display signal is generated.

Performance of black insertion for pixels in the frame-extracted area in the displayer refers to insertion of a full black frame into the pixels in the frame-extracted area by the processor within two or more adjacent frames, to achieve an effect of increasing the total number of frames and make the original smeared picture become clear. In addition to inserting a whole frame of black picture, black insertion may also be performed by virtue of constant flash. This is not limited in this embodiment of the present disclosure in any way.

At step 600, display is performed according to the display signal.

In an embodiment, a transparent display screen displays according to the display signal.

The method for controlling the smart window provided by embodiments of the present disclosure may comprise: detecting whether a close-range scene exists, and collecting position information of a human eye, calculating coordinates of the close-range scene, calculating coordinates of the human eye according to the position information of the human eye, obtaining a frame-extracted area according to the coordinates of the close-range scene and coordinates of the human eye, performing black insertion for pixels in the frame-extracted area in the displayer, and generating a display signal, displaying according to the display signal. The technical solutions provided by embodiments of the present disclosure make movement of an object in a close-range scene become slower by detecting the close-range scene, obtaining the frame-extracted area according to the coordinates of the close-range scene and coordinates of the human eye, and performing black insertion for the pixels in the frame-extracted area in the displayer. By means of distinguishing the close-range scene from the far-range scene and dynamically performing frame-extraction depending on respective areas, this may ensure that an occupant may see a far-range scene without being disturbed by the close-range scene, and effectively solve the dizziness problem.

In an embodiment, before the step 100, the method for controlling the smart window provided by the embodiment of the present disclosure may further comprise: judging whether the moving speed of the smart window is greater than or equal to a speed threshold, and sending a detection instruction and a collection instruction when it is judged that the moving speed of the smart window is greater than or equal to the speed threshold. In this case, step 100 may comprise detecting whether the close-range scene exists according to the detection instruction, and collecting the position information of the human eye according to the collection instruction.

Based on the inventive concepts of the present disclosure, embodiments of the present disclosure may further provide a transport vehicle. The transport vehicle provided by an embodiment of the present disclosure may comprise a plurality of smart windows as described above.

In an embodiment, the transport vehicle may be an automobile or a train, so long as it is a transport vehicle that may cause dizziness. This is not limited in the embodiment of the present disclosure in any way.

The smart window is the smart window provided by the foregoing embodiment, and its implementation principle and implementation effect are similar, and will not be detailed any more herein.

It should be appreciated that figures of the embodiments of the present disclosure only relate to exemplary structures involved in the embodiments of the present disclosure, and other structures may refer to general design. In the case of no conflict, embodiments of the present disclosure and features in the embodiments may be combined to obtain new embodiments.

The embodiments revealed in the present disclosure are as described above, but the contents stated therein are merely used to facilitate the understanding of the present disclosure, and are not intended to limit the present disclosure. Any modifications or variations in the form and details of the implementation may be made by those skilled in the art without departing from the spirit and scope of the disclosure.

However, the extent of protection of the present disclosure should still be subject to the scope defined by the appended claims.

The invention claimed is:

1. A smart window, comprising:
a detector;
a collector;
a displayer; and
a processor,
wherein the detector is configured to detect whether a close-range scene exists,
wherein the collector is configured to collect position information of a human eye,
wherein the processor is connected to the detector and the collector, and is configured to calculate coordinates of the close-range scene, calculate coordinates of the human eye according to the position information of the human eye, obtain a frame-extracted area according to the coordinates of the close-range scene and coordinates of the human eye, perform black insertion for pixels in the frame-extracted area in the displayer, and generate a display signal, and
wherein the displayer is connected to the processor and configured to display according to the display signal;
wherein the processor is further configured to determine whether a moving speed of the smart window is greater than or equal to a speed threshold, and send a detection instruction to the detector and a collection instruction to the collector when it is determined that the moving speed of the smart window is greater than or equal to the speed threshold,
wherein the detector is further configured to detect whether the close-range scene exists according to the detection instruction, and
wherein the collector is further configured to collect the position information of the human eye according to the collection instruction.

2. The smart window according to claim 1, wherein the detector comprises a plurality of infrared sensors.

3. The smart window according to claim 2, wherein the plurality of infrared sensors are in a direction vertical to the ground.

4. The smart window according to claim 2, wherein the processor is configured to calculate the coordinates of the close-range scene according to coordinates of an infrared sensor of the plurality of infrared sensors that detects the close-range scene, the moving speed of the smart window, a moving duration of the smart window after the close-range scene is detected, and a distance between the infrared sensor and the close-range scene.

5. The smart window according to claim 1, wherein the displayer comprises a transparent display screen.

6. The smart window according to claim 1,
wherein the position information of the human eye comprises a distance between the human eye and the collector, an angle between a line segment connecting the human eye with the collector and a first direction, and an angle between the line segment connecting the human eye with the collector and a second direction, and
wherein the first direction is a direction vertical to the ground, and the second direction is a moving direction of the smart window.

7. The smart window according to claim 1, wherein the detector is configured to detect whether there is a close-range scene within a threshold distance.

8. The smart window according to claim 1, wherein the processor is configured to calculate the coordinates of the human eye according to coordinates of the collector and the position information of the human eye.

9. The smart window according to claim 1, wherein the processor is configured to obtain coordinates of an intersection point between a line segment connecting the human eye with the close-range scene and the displayer according to the coordinates of the close-range scene and the coordinates of the human eye, and obtain a frame-extracted area according to the coordinates of the intersection point and a resolution of the displayer.

10. A transport vehicle, comprising a plurality of smart windows according to claim 1.

11. A method for controlling a smart window, the method applied to the smart window according to claim 1, the method comprising:
detecting whether a close-range scene exists;
collecting position information of a human eye;
calculating coordinates of the close-range scene;
calculating coordinates of the human eye according to the position information of the human eye;
obtaining a frame-extracted area according to the coordinates of the close-range scene and the coordinates of the human eye;
performing black insertion for pixels in the frame-extracted area in the displayer, and generating a display signal; and
displaying according to the display signal.

12. The method according to claim 11, wherein before detecting whether a close-range scene exists and collecting the position information of the human eye, the method further comprises:
determining whether a moving speed of the smart window is greater than or equal to a speed threshold, and
generating a detection instruction and a collection instruction when it is determined that the moving speed of the smart window is greater than or equal to the speed threshold,
wherein detecting whether a close-range scene exists comprises detecting whether the close-range scene exists according to the detection instruction, and
wherein collecting the position information of the human eye comprises collecting the position information of the human eye according to the collection instruction.

13. The method according to claim 11, wherein detecting whether the close-range scene exists comprises detecting whether there is a close-range scene within a threshold distance.

14. The method according to claim 11, wherein the detector comprises a plurality of infrared sensors, and the calculating coordinates of the close-range scene comprises:
calculating the coordinates of the close-range scene according to coordinates of an infrared sensor of the plurality of infrared sensors that detects the close-range scene, a moving speed of the smart window, a moving duration of the smart window after the close-range scene is detected, and a distance between the infrared sensor and the close-range scene.

15. The method according to claim 11, wherein the position information of the human eye comprises a distance between the human eye and the collector, an angle between a line segment connecting the human eye with the collector and a first direction, and an angle between the line segment connecting the human eye with the collector and a second direction, wherein the first direction is a direction vertical to the ground, and the second direction is a moving direction of the smart window.

16. The method according to claim 15, wherein the calculating coordinates of the human eye according to the position information of the human eye comprises:
calculating coordinates of the human eye according to coordinates of the collector and the position information of the human eye.

17. The method according to claim 16, wherein the coordinates of the human eye are obtained using the following equations:

$a = a_0 - l \sin \theta_1 \cos \theta_2$ $b = b_0 - l \cos \theta_1$ $c = c_0 - l \sin \theta_1 \sin \theta_2,$ where a represents an x coordinate of the human eye, b represents a y coordinate of the human eye, c represents a z coordinate of the human eye, $a_0$ represents an x coordinate of the collector, $b_0$ represents a y coordinate of the collector, and $c_0$ represents a z coordinate of the collector, l represents the distance between the human eye and the collector, $\theta_1$ represents the angle between the line segment connecting the human eye with the collector and the first direction, and $\theta_2$ represents the angle between the line segment connecting the human eye with the collector and the second direction.

18. The method according to claim 11, wherein the obtaining the frame-extracted area according to the coordinates of the close-range scene and the coordinates of the human eye comprises:
obtaining coordinates of an intersection point between a line segment connecting the human eye with the close-range scene and the displayer according to the coordinates of the close-range scene and the coordinates of the human eye; and
obtaining a frame-extracted area according to the coordinates of the intersection point and a resolution of the displayer.

19. The method according to claim 11, wherein performing black insertion comprises inserting a full black frame for pixels within the frame-extracted area in two or more adjacent frames.

* * * * *